Figure 1:
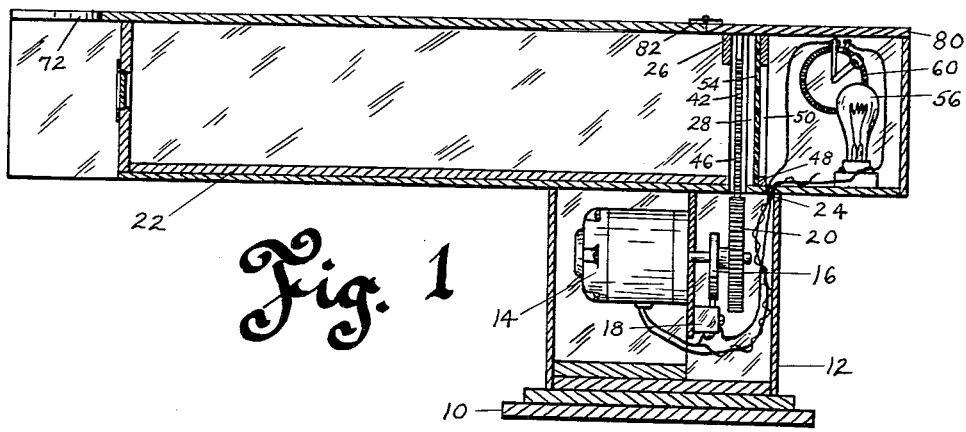

April 10, 1956   C. W. LANGE   2,741,245
EYE EXERCISING DEVICE
Filed Oct. 21, 1949

INVENTOR
Carl W. Lange
BY
*Rey Eilers*
ATTORNEY

# United States Patent Office 2,741,245
Patented Apr. 10, 1956

2,741,245

EYE EXERCISING DEVICE

Carl W. Lange, St. Louis, Mo.

Application October 21, 1949, Serial No. 122,633

9 Claims. (Cl. 128—76.5)

This invention relates to improvements in optical instruments. More particularly this invention relates to an improved optical instrument which teaches full mental perception of visual impressions received by the eyes.

It is therefore an object of the present invention to provide an improved optical instrument that teaches full mental perception of visual impressions received by the eyes.

It is frequently stated that defective vision is due to distortions or malformations of the cornea or the aqueous humor of the eye. Any distortion or malformation of these two components of the eye could easily cause defective vision since these two components largely provide the refraction necessary for vision. In some instances defective vision is actually due to defects or malformations in the cornea or aqueous humor of the eye, but in many more instances defective vision is due to inadequate or incorrect mental perception of the visual impressions received by the eyes. In some instances the patient's brain almost completely suppresses the visual impressions from one eye; this phenomenon usually being noted in patients whose eyes are "crossed." In other instances the patient's brain will perceive visual impressions from both eyes but will partially suppress the visual impressions from one of those eyes; this phenomenon usually being noted in patients having an amblyopic eye. Where defective vision is due to this inadequate or incorrect mental perception of the visual impressions received by the patient's eye, the use of corrective spectacles or the exercising of the intrinsic and extrinsic muscles of the eyes will be unable to improve the patient's vision for long, if at all. Such improvement in the patient's vision is, however, provided by the optical instrument contemplated by the present invention. That instrument teaches the patient's brain to perceive the visual impressions received by the patient's suppressed eye while the patient's brain is also perceiving the visual impressions received by the patient's dominant eye. It is therefore an object of the present invention to provide an optical instrument which teaches the patient's brain to perceive visual impressions from both eyes.

The optical instrument provided by the present invention does this by presenting to the patient's view instructive trans-illuminated charts which have portions that move. The charts are so constructed that distinctively different visual impressions will be received by each of the patient's eyes, and each of those impressions should be perceived by the patient's brain. Failure of the patient's brain to perceive the two different impressions will indicate which eye is suppressed; and thereafter a sufficiently high degree of stimulation can be given that eye, by motion of one portion of the trans-illuminated chart, to force the patient's brain to perceive the visual impression received by that eye. It is therefore an object of the present invention to provide instructive trans-illuminated charts that have portions which move.

The charts provided by the present invention have relatively large, mutually distinct patterns thereon. The mutual distinctiveness of the patterns is necessary to enable the patient to recognize when his brain is perceiving the visual impressions received by both eyes. The large size of the patterns is necessary because the suppression of one eye is frequently so complete that small or moderate-sized patterns would be completely missed. It is therefore an object of the present invention to provide large, mutually distinct patterns for charts used in optical instruments.

The optical instrument provided by the present invention enables the patient to attain (1) better vision in an amblyopic left eye, (2) better vision in an amblyopic right eye, (3) better rotation of the left eye, (4) better rotation of the right eye, (5) better abduction for both eyes, (6) better adduction for both eyes, (7) better fusion for both eyes, (8) better stereopsis for both eyes, (9) better peripheral vision for the left eye, and (10) better peripheral vision for the right eye. Thus the one optical instrument can be used to correct or reduce many different types of sight imperfections.

The present invention makes this possible by providing the optical instrument with a rotation-imparting mechanism that can selectively cause movement of one or the other or both of the two portions of the various charts, and which can be separated from those charts. The rotation-imparting mechanism is preferably a motor-driven gear, and it will engage gears in the charts; the gears in the charts causing movement of the pattern-carrying portions of the charts. It is therefore an object of the present invention to provide a motor-driven gear and interchangeable charts; some of which can rotate one pattern, others of which can rotate the other pattern, and still others of which can rotate both patterns.

By having the charts readily interchangeable, the present invention makes it possible to provide a number of charts directed to the same teaching. This is highly desirable because it facilitates the teaching of a particular mental perception without any monotony; the use of a number of different charts directed to the same teaching providing variety and interest. It is therefore an object of the present invention to provide a number of interchangeable charts directed to the same teaching.

The movable pattern-carrying portions of the charts provided by the present invention will preferably be gears. These gears will be wholly enclosed and contained within the chart, and they will be rotated by a small connecting gear which has a portion that projects out from the chart. The projecting portions of the connecting gears will releasably engage the motor-driven gear of the optical instrument and will cause the gears within the charts to rotate. The connecting gears and the pattern-carrying gears can be interrelated in various ways to provide several combinations of relative motion for the patterns, without requiring any change in the nature, size or direction of rotation of the motor-driven gear of the instrument. It is therefore an object of the present invention to provide charts which contain pattern-carrying gears and connecting gears, and to interrelate those gears so they can provide various combinations of motions without any change in the nature, size or direction of the rotation of the motor-driven gear.

The motor-driven gear of the optical instrument provided by the present invention will be disposed wholly between the lines of sight from the patient's eyes to the source of illumination for the charts. This permits full trans-illumination of the charts when those charts are made of transparent material, and it also permits the use of colored filters between the charts and the source of illumination.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
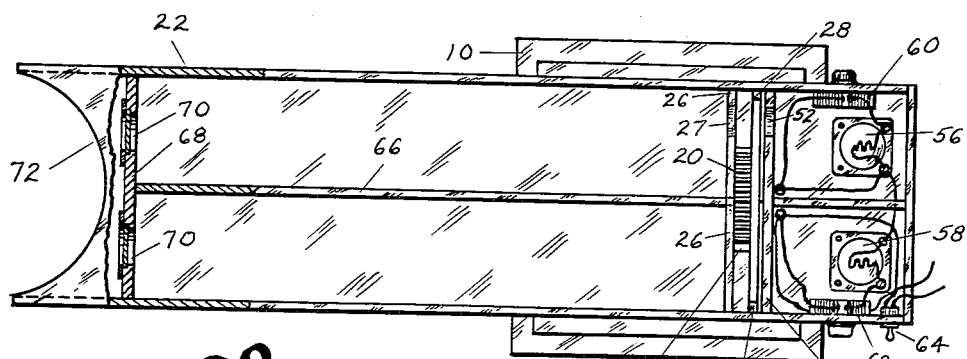
Figure 4:
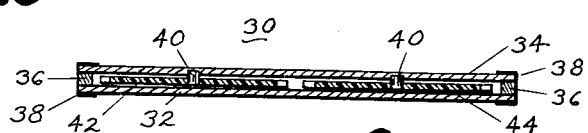
Figure 3:
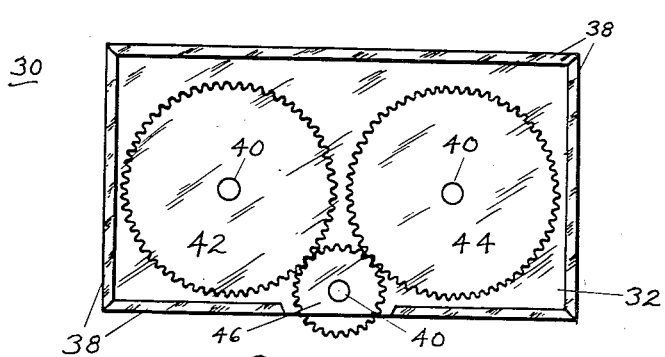

In the drawing Fig. 1 is a cross-sectional, side view of an optical instrument that is made in accordance with the principles and teachings of the present invention, Fig. 2 is a partially broken-away plan view of the optical instrument of Fig. 1, Fig. 3 is a front elevational view of a chart that is usable with the optical instrument of Figs. 1 and 2, and it shows the interrelation of the gears of that chart (the patterns normally carried by the gears not being shown lest the showing of those patterns obscure the showing of the gears), and Fig. 4 is a cross-sectional plan view of the chart of Fig. 3.

Referring to the drawing in detail, the numeral 10 denotes the base of an optical instrument that is made in accordance with the principles and teachings of the present invention. Extending upwardly from the base 10 is a motor and gear housing 12; that housing containing a motor 14 and a gear 20. The shaft of the motor 14 carries the gear 20, and in addition it carries a cam 16; that cam being dimensioned to strike the actuator of a normally-closed switch 18 during each revolution of the motor 14. The housing 12 confines and encloses motor 14, cam 16, switch 18, and motor-driven gear 20 and protects them from dust and dirt.

A substantially light-tight housing 22 is secured to and supported by the motor and gear housing 12; housing 22 projecting both forwardly and rearwardly from the motor and gear housing 12. A slot 24 is provided in the bottom of the light-tight housing 22 immediately above and in registry with the motor driven gear 20. A horizontally-disposed support 26 is located above and forwardly of the slot 24; and that support coacts with vertically-disposed supports 28, that are rearward of slot 24, to define a recess into which charts can be introduced.

A typical chart usable with the optical instrument of Figs. 1 and 2 is shown in Figs. 3 and 4; that chart being denoted generally by the numeral 30. The chart 30 has a front plate 32 of a transparent, fracture-resistant material such as Lucite, Plexiglas or the like. A back plate 34, of similar material, is provided for the chart 30; and the two plates are coextensive. Spacers 36 are disposed between the edges of the transparent plates 32 and 34, and they space the center portions of those plates apart. A tape 38 begins adjacent a point at one side of the lower center of the plates 32 and 34, extends around the sides and tops of the plates 32 and 34 and terminates adjacent a point at the other side of the lower center of plates 32 and 34. The tape 38 holds the front plate 32 and the back plate 34 and the spacers 36 in assembled relation; thus making the chart a unitary structure. The tape 38 also protects the interior of the chart against entry of dirt, dust or other foreign matter. Pivots 40 are disposed within the interior of the chart 30; those pivots preferably being cemented in recesses in the back plate 34 of the chart 30. These pivots rotatably support gear 42, gear 44, and connecting gear 46. The gears 42 and 44 are preferably made of the same transparent material of which the front and back plates 32 and 34 are made. The connecting gear 46 may also be made of transparent material, but it can be made of opaque material.

As shown particularly in Figure 3, the gears 42 and 44 are wholly enclosed within the space between the front and back plates 32 and 34 of the chart 30, but the connecting gear 46 has the lower portion thereof projecting below the lower edges of those plates. The projecting portion of the gear 46 can extend through the slot 24 in the bottom of the substantially light-tight housing 22; engaging and being acted upon, at such times, by the motor-driven gear 20 in the motor and gear housing 12. The connecting gear 46 of Fig. 3 will drive both the gear 42 and the gear 44. The connecting gears of other charts may be arranged to drive one or both of the gears 42 and 44, and in some instances one of the gears 42 and 44 can drive the other. In the various charts 30 the gears 42, 44 and 46 can provide different combinations of motion; but in each and every case the gears 42 and 44 are wholly enclosed within the space defined by plates 32 and 34 of the charts, and the connecting gears 46 have portions extending below the edges of the charts to engage and be driven by the motor-driven gear 20.

A wall 48 is disposed within the light-tight housing 22, and that wall is located rearwardly of the vertically-directed supports 28. The wall 48 has two spaced openings 50 therein; the openings 50 being generally coextensive with the gears 42 and 44 carried within the charts 30. A notch 52 is provided in the top edge of the wall 48, and that notch facilitates the grasping of a filter 54 that is disposed between the wall 48 and the vertically-directed supports 28. A similar notch is formed in the top edge of support 26, and that notch is denoted by the numeral 27. The notch 27 facilitates grasping of the charts 30. The filter 54 will be held in position by the conjoint action of supports 28 and wall 48, and it can easily be removed from the housing 22 by grasping its upper edge. The filter 54 will preferably be of a transparent fracture-resistant material, and it will be colored so it can affect the stimulation provided by the patterns of the charts 30. In some instances, as where both eyes need considerable stimulation, the filter will be red throughout. In other instances, as where one eye needs a strong stimulus and the other needs a sedative, the portion of the filter presented to the eye in need of stimulation will be red, and the other half of the filter will be blue.

Electric lamps 56 and 58 are disposed at the rear end of the light-tight housing 22; and those lamps will be in register with the openings 50 in the wall 48 and with the gears 42 and 44 of the charts 30. These lamps will provide illumination that can be viewed through the charts 30, and thus provide trans-illumination of the patterns of those charts. A rheostat 60 is provided adjacent the lamp 56, and a rheostat 62 is provided adjacent the lamp 58; and these rheostats can be used to regulate the intensity of lamps 56 and 58.

A switch 64 is provided for the optical instrument, and that switch will control the energization and deenergization of motor 14 and lamps 56 and 58. The various electrical components of the optical instrument can be connected together in different ways, but the following arrangement works well. One side of the line is connected to one terminal of the motor 14 and to the stationary terminals of the rheostats 60 and 62, and the other side of the line is connected through switch 64 to the other terminal of motor 14 and to one terminal of switch 18, and a lead extends from the other terminal of switch 18 past lamps 56 and 58 to the adjustable terminals of the rheostats 60 and 62. Closing of the switch 64 will energize the motor 14 and the lamps 56 and 58. The intensity of the lamps 56 and 58 can be set at any desired values by proper adjustment of the rheostats 60 and 62. Once energized, the lamps 56 and 58 will remain energized until the switch 64 is opened or until cam 16 strikes the actuator of switch 18 and opens that switch. When the switch 18 is thus opened, the lamps 56 and 58 will be deenergized and will remain deenergized until the cam 16 passes the actuator of switch 18. The motor-driven gear 20 is so dimensioned relative to the gears 46, 42 and 44 of the charts 30 that each of the gears 42 and 44 will make more than one revolution while the gear 20 is making one revolution. This enables the gears 42 and 44 to make more than one full revolution each time lamps 56 and 58 are energized. Such an arrangement enables the patient to obtain full value from the patterns of the charts 30 since his eyes can follow the patterns through all phases of their rotation.

A septum 66 is disposed within the substantially light-tight housing 22, and that septum extends longitudinally of that housing. The septum 66 preferably begins adjacent the chart 30 and terminates at a wall 68 located at the front end of the substantially light-tight housing 22. Openings 70 are provided in the wall 68 and those openings receive lenses. The lens in the lefthand opening 70 defines one end of a line of sight which passes through the lefthand pattern of the chart 30 to the lamp 56 while the lens in the righthand opening 70 defines one end of a line of sight which passes through the righthand pattern of chart 30 to the lamp 58. The openings 70 are dimensioned to register with the eyes of a patient; and an arcuate cut-away portion 72 is provided in the cover of the light-tight housing 22 to fit the forehead of the patient. This cut-away portion guides the patient in placing his eyes in register with the openings 70 and also assists in keeping stray light from contacting the patient's eyes.

The gears 42, 44 and 46 are spur gears, and the clearance circles, pitch circles and addendum circles of those gears are dimensioned so those gears can engage and drive each other. Although not indicated in the drawing, lest the showing thereof becloud the showing of the arrangement of the gears within the charts 30, all portions of the charts 30 that are disposed outwardly of the patterns of those charts will be masked. This masking will usually be done by coating the confronting surfaces of the front and back plates 32 and 34 with a dense black paint or ink, or by gluing black sheets to one or the other or both of those plates. The paint, ink or sheets will define two large circular openings in register with the patterns of the charts; those openings being small enough to permit the teeth of the gears to be hidden but large enough to permit viewing of the full extent of the patterns. This masking of those portions of charts 30 which are disposed outwardly of the patterns of those charts will provide such a strong contrast with the trans-illuminated patterns of the charts that the patient's eyes will be irresistibly drawn to those patterns.

The charts 30 and filters 54 can be inserted into and removed from the light-tight housing 22 whenever the hinged portion 80 of the cover of that housing is raised. The hinged portion 80 can be rotated from closed position to raised position around the hinges 82. Once the charts 30 and filters 54 have been set in place, the hinged portion 80 of the cover can be moved back to the position shown in Fig. 1, where it will remain due to gravitational and frictional forces.

Charts with a number of different patterns can be used with the optical instrument provided by the present invention; the selection of the particular patterns used being determined by the needs of the patient.

Correction of amblyopia in th left eye, correction of amblyopia in the right eye, improved rotation of the left eye, improved rotation of the right eye, improved abduction, improved adduction, improved fusion, improved stereopsis, improved peripheral vision for the left eye, and improved peripheral vision for the right eye are all made possible with the optical instrument provided by the present invention. Selection of the proper charts 30 and their insertion in the instrument are all that is needed to initiate correction of the sight imperfections.

The patterns of the charts will usually be defined by black, opaque ink, paint or paper; but those patterns can be defined by opaque or translucent inks, paints or papers of different colors. In fact, different combinations of opaque or translucent colors can be used in making those patterns. This makes additional stimulation possible.

Whereas a preferred embodiment of the present invention has been shown and described in the drawing and accompanying description, it should be obvious to those skilled in the art that various changes may be made in the form of the invention without affecting the scope thereof.

What I claim is:

1. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive said chart, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart.

2. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive said chart, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart, said source of illumination and said openings being oppositely disposed of said space and the said first gear of said chart being light-transmissive whereby the said one pattern will be trans-illuminated.

3. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive said chart, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart, a second space in said housing, and a stimulation-controlling filter selectively disposable within said second space, said second space being intermediate said source of illumination and the first said space and the first said space being intermediate said openings and said second space whereby the said chart in the first said space is directly visible through said openings and whereby light passing to the said chart will pass through said stimulation-controlling filter.

4. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive said chart, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart, said chart having a third gear that meshes with and is driven by said driving gear of said chart whereby the first said and said third gears of said chart rotate in the same direction, said third gear carrying the other of said patterns.

5. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive said chart, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart, said chart having a third gear that meshes with and is driven by the first said gear of said chart whereby the first said and said third gears of said chart rotate in opposite directions, said third gear carrying the other of said patterns.

6. The combination of an optical instrument and a pattern-carrying chart which is one of a plurality of pattern-carrying charts that are interchangeably usable with said instrument to teach mental perception of visual impressions, said instrument comprising a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination to selectively receive any one of said charts, said septum being disposed between said openings and said space, a motion-imparting mechanism that is adjacent to and is in communication with said space, said chart having a pattern that is registerable with the said one opening and having a second pattern that is registerable with said other opening whenever said chart is in said space, said chart having a gear rotatably mounted thereon, and said chart having a driving gear rotatably mounted thereon, the driving gear of said chart meshing with and driving the first said gear of said chart and extending outwardly beyond the edge of said chart, said driving gear of said chart engaging and being driven by said motion imparting mechanism whenever said chart is within said space, one of the patterns of said chart being mounted on and being rotatable with the first said gear of said chart, said motion imparting mechanism being a motor-driven gear.

7. An optical instrument that can be used in teaching mental perception of visual impressions and that comprises a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination, guides adjacent said space to selectively receive and guide any one of a number of interchangeable gear-equipped, movable-pattern charts that are adapted to be used with said optical instrument, said septum being disposed between said openings and said space, and a motor driven, motion-imparting mechanism that is adjacent to and is in communication with said space and can act upon the gears of said gear-equipped, movable-pattern charts to move the patterns of movable-pattern charts disposed within said space and guided by said guides.

8. An optical instrument that can be used in teaching mental perception of visual impressions and that comprises a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination, guides adjacent said space to selectively receive and guide any one of a number of interchangeable gear-equipped, movable-pattern charts that are adapted to be used with said optical instrument, said septum being disposed between said openings and said space, and a motor-driven, motion-imparting mechanism that is adjacent to and is in communication with said space and can act upon the gears of said gear-equipped, movable-pattern charts to move the patterns of movable-pattern charts disposed within said space and guided by said guides, said source of illumination and said openings being oppositely disposed of said space to trans-illuminate said charts.

9. An optical instrument that can be used in teaching mental perception of visual impressions and that comprises a housing, a septum, openings in said housing that are registerable with the eyes of a patient, one of said openings being disposed on one side of said septum, the other of said openings being disposed on the other side of said septum, a source of illumination within said housing, a space in said housing adjacent said source of illumination, guides adjacent said space to selectively receive and guide any one of a number of interchangeable gear-equipped, movable-pattern charts that are adapted to be used with said optical instrument, said septum being disposed between said openings and said space, and a motor-driven motion-imparting mechanism that is adjacent to and is in communication with said space and can act upon the gears of said gear-equipped, movable-pattern charts to move the patterns of movable-pattern charts disposed within said space and guided by said guides, a second space in said housing, and a stimulation-controlling filter selectively disposable within said second space, said second space being intermediate said source of illumination and the first said space and the first said space being intermediate said openings and said second space whereby any chart in the first said space is directly visible through said openings and whereby light passing to any such chart will pass through said stimulation-controlling filter.

References Cited in the file of this patent

UNITED STATES PATENTS

| Number | Name | Date |
| --- | --- | --- |
| Re. 21,082 | Idzal | May 16, 1939 |
| 1,116,201 | Apfelbaum | Nov. 3, 1914 |
| 1,723,910 | Aramburu | Aug. 6, 1929 |
| 1,770,448 | Yetta | July 15, 1930 |
| 1,959,217 | Pieper | May 15, 1934 |
| 1,967,625 | Parkins | July 24, 1934 |
| 2,091,173 | Wottring | Aug. 24, 1937 |
| 2,152,050 | Henning | Mar. 28, 1939 |
| 2,200,060 | Geiser | May 7, 1940 |
| 2,231,193 | Newton | Feb. 11, 1941 |
| 2,245,110 | Marcaccio | June 10, 1941 |
| 2,505,340 | Poslusny | Apr. 25, 1950 |